(12) United States Patent
Liu

(10) Patent No.: US 11,933,509 B2
(45) Date of Patent: Mar. 19, 2024

(54) COMPRESSOR DRIVING DEVICE, COMPRESSOR PRESSURE PROTECTION METHOD, AND AIR CONDITIONER

(71) Applicants: GD Midea Heating & Ventilating Equipment Co., Ltd., Foshan (CN); Midea Group Co., Ltd., Foshan (CN)

(72) Inventor: Kai Liu, Foshan (CN)

(73) Assignees: GD MIDEA HEATING & VENTILATING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 220 days.

(21) Appl. No.: 17/489,497

(22) Filed: Sep. 29, 2021

(65) Prior Publication Data

US 2022/0018563 A1 Jan. 20, 2022

Related U.S. Application Data

(63) Continuation of application No. PCT/CN2020/077829, filed on Mar. 4, 2020.

(30) Foreign Application Priority Data

Sep. 9, 2019 (CN) .......................... 201910855486.X

(51) Int. Cl.
*F24F 11/32* (2018.01)
*F24F 11/86* (2018.01)
(Continued)

(52) U.S. Cl.
CPC .............. *F24F 11/32* (2018.01); *F24F 11/86* (2018.01); *F24F 11/88* (2018.01); *H02P 27/06* (2013.01); *F24F 2140/12* (2018.01)

(58) Field of Classification Search
CPC .. F24F 11/32; F24F 11/86; F24F 11/88; F24F 2140/12; F24F 11/49; F24F 11/64;
(Continued)

(56) References Cited

U.S. PATENT DOCUMENTS

| 5,277,032 A * | 1/1994 | See ..................... F25B 45/00 62/77 |
| 6,102,665 A * | 8/2000 | Centers ................... F04B 49/10 417/18 |
| 2018/0283724 A1* | 10/2018 | Van Eldik ............. F25B 49/022 |

FOREIGN PATENT DOCUMENTS

| CN | 205232076 A | 5/2016 |
| CN | 106505527 A | 3/2017 |

(Continued)

OTHER PUBLICATIONS

Guangdong Midea HVAC Equipment Co., Ltd., English translation of ISR for PCT application PCTCN2020077829, Sep. 6, 2020, 9 pgs.

(Continued)

*Primary Examiner* — David Luo
(74) *Attorney, Agent, or Firm* — Morgan, Lewis & Bockius LLP

(57) ABSTRACT

A compressor driving device includes a three-phase alternating current power supply input end, a relay module, a rectifier circuit, and a driving control circuit which are sequentially connected; the rectifier circuit is used for converting connected alternating current into direct current and then outputting the direct current to a direct current bus; the driving control circuit is used for converting the direct current output by the direct current bus into compressor driving power; a pressure switch is used for measuring the pressure value in a refrigerating system, and when the measured pressure value is larger than a preset pressure threshold, disconnecting the power supply circuit of the (Continued)

relay module; the driving control circuit is also used for detecting the on-off state of the pressure switch and controlling the compressor to stop working when the pressure switch is switched off.

10 Claims, 2 Drawing Sheets

(51) Int. Cl.
*F24F 11/88* (2018.01)
*F24F 140/12* (2018.01)
*H02P 27/06* (2006.01)

(58) Field of Classification Search
CPC ......... F24F 11/70; H02P 27/06; H02P 29/024; F25B 2500/07; F25B 2600/021; F25B 49/025; F25B 2600/0251; F25B 2700/151; F25B 2700/1931; Y02B 30/70; H02M 1/36; H02M 5/458; H02M 7/02
USPC ..................................................... 318/3, 558
See application file for complete search history.

(56) References Cited

FOREIGN PATENT DOCUMENTS

| CN | 107084514 A | 8/2017 |
|---|---|---|
| CN | 107091517 A | 8/2017 |
| CN | 107143985 A | 9/2017 |
| CN | 108662730 A | 10/2018 |
| CN | 109545620 A | 3/2019 |
| CN | 110594953 A | 12/2019 |
| CN | 111005862 A | 4/2020 |
| EP | 2421149 A1 | 2/2012 |
| KR | 20190072893 A | 6/2019 |

OTHER PUBLICATIONS

GmbH of Guangdong America's Heating and Heating Devices GmbH America's GmbH, English translation of First OA for CN application 201910855486.X, Jul. 21, 2020, 8 pgs.
GmbH of Guangdong America's Heating and Heating Devices GmbH America's GmbH, English translation of Second OA for CN application 201910855486.X, Mar. 12, 2021, 9 pgs.
Guangdong Midea HVAC Equipment Co., Ltd., English translation of Third OA for CN application 201910855486.X, Jun. 22, 2021, 16 pgs.
Midea Group Co., Ltd., WO, PCT/CN2020/077829, Jun. 9, 2020, 6 pgs.
Midea Group Co., Ltd., IPRP, PCT/CN2020/077829, Mar. 9, 2022, 7 pgs.
Midea Group Co., Ltd., Extended European Seach Report, EP20862470.0, dated Jun. 1, 2022, 6 pgs.

* cited by examiner

COMPRESSOR DRIVING DEVICE, COMPRESSOR PRESSURE PROTECTION METHOD, AND AIR CONDITIONER

CROSS-REFERENCE TO RELATED APPLICATIONS

This application is a continuation application of International (PCT) Patent Application No. PCT/CN2020/077829 filed on Mar. 4, 2020, which claims priority to Chinese Patent Application No. 201910855486.X, filed on Sep. 9, 2019, the disclosure of which are hereby incorporated by reference in its entirety.

TECHNICAL FIELD

The present application relates to the technical field of refrigeration equipment, and particularly to a compressor driving device, a compressor pressure protection method, and an air conditioner.

BACKGROUND

System pressure of an air conditioning system needs to meet a safe working pressure requirement in an operating process. It is absolutely not allowed that a compressor does not timely stop operating and the pressure further keeps rising to damage the air conditioning system in case of abnormal pressure, e.g., overpressure. Therefore, how to ensure the safe and reliable operation of the compressor becomes a technical problem urgent to be solved.

SUMMARY

A main objective of the present application is to disclose a compressor driving device, a compressor pressure protection method, and an air conditioner, to ensure the safe and reliable operation of a compressor.

In order to achieve the above objective, the present application discloses a compressor driving device, which is used for driving a compressor of a refrigerating system and characterized by including a three-phase alternating current power supply input end, a relay module, a rectifier circuit, and a driving control circuit which are sequentially connected.

The rectifier circuit is configured to convert connected alternating current into direct current and then output the direct current to a direct current bus.

The driving control circuit is configured to convert the direct current outputted by the direct current bus into compressor driving power to drive the compressor to work.

The compressor driving device further includes a pressure switch, and the pressure switch is connected in series with a power supply circuit of the relay module and configured to measure a pressure value in the refrigerating system, and when the measured pressure value is greater than a preset pressure threshold, disconnect the power supply circuit of the relay module.

The driving control circuit is further configured to detect an on-off state of the pressure switch and control the compressor to stop working when the pressure switch is switched off.

In some embodiments of the present application, a detection end of the driving control circuit is connected to the direct current bus. The driving control circuit is further configured to detect a voltage of the direct current bus in real time, and when it is detected that the voltage of the direct current bus drops to a first preset voltage value during the work of the compressor, control the compressor to stop working.

In some embodiments of the present application, the driving control circuit is further configured to control the compressor to stop working when it is detected that the pressure switch is switched off and the detected voltage of the direct current bus is greater than or equal to a second preset voltage value.

In some embodiments of the present application, the driving control circuit is further configured to start timing when it is detected that the pressure switch is switched off, detect whether a voltage value on the direct current bus is greater than the second preset voltage value after a preset time has been reached, and when the voltage value on the direct current bus is greater than or equal to the second preset voltage value, determine that the relay module malfunctions and output a malfunction detection signal.

In some embodiments of the present application, the driving control circuit includes a compressor driving chip.

The compressor driving chip is configured to control the compressor to work and detect an operating state of the compressor.

In some embodiments of the present application, the driving control circuit further includes a detection driving chip connected to the compressor driving chip.

The detection control chip is configured to detect the on-off state of the pressure switch when it is determined that the compressor is in a working state according to a compressor state signal outputted by the compressor driving chip.

In some embodiments of the present application, the compressor driving device further includes an electronic control board. A slot is disposed at the electronic control board. The detection control chip is detachably mounted in the slot.

In some embodiments of the present application, the driving control circuit further includes an Intelligent Power Module (IPM) and a signal isolation module. An input end of the signal isolation module is connected to an output end of the compressor driving chip. An output end of the signal isolation module is connected to an input end of the IPM.

The IPM is configured to drive the compressor to operate at a corresponding rotation speed according to a control signal outputted by the compressor driving chip.

The detection control chip is further configured to control the signal isolation module to stop working to stop outputting compressor driving signals when it is detected that the pressure switch is switched off;

and/or, the detection control chip is further configured to control the compressor driving chip to stop outputting compressor driving signals when it is detected that the pressure switch is switched off.

The present application also discloses a compressor pressure protection method, which is applied to a refrigerating system including a compressor driving device. The compressor pressure protection method is characterized by including the following steps:

measuring a pressure value in the refrigerating system when a compressor works normally; and when the pressure value in the refrigerating system is greater than a preset threshold, disconnecting a power supply circuit of the compressor, and controlling the driving device to stop outputting compressor driving signals.

In some embodiments of the present application, the disconnecting a power supply circuit and controlling the driving device to stop outputting compressor driving signals when the pressure value in the refrigerating system is greater than a preset threshold includes:

when the pressure value in the refrigerating system is greater than the preset threshold, disconnecting the power supply circuit of the compressor, and then detecting a voltage value on a direct current bus in the power supply circuit of the compressor; and controlling the compressor driving device to stop outputting compressor driving signals when the voltage value on the direct current bus is greater than or equal to a preset voltage value.

The present application also discloses an air conditioner, which includes the abovementioned compressor driving device or uses the abovementioned compressor pressure protection method.

According to the present application, the rectifier circuit and the relay module are arranged, and when the relay module is turned on, the rectifier circuit converts connected alternating current of the relay module into direct current and then outputs the direct current to the direct current bus such that the driving control circuit converts the direct current outputted by the direct current bus into compressor driving power according to a received control signal to drive the compressor to work. According to the present application, the pressure switch is arranged to measure the pressure value in the refrigerating system and, when the measured pressure value is greater than the preset pressure threshold, disconnect the power supply circuit of the relay module, so that the power supply circuit of the compressor is disconnected to de-energize the compressor to stop working when a relay is switched off. The driving control circuit controls the compressor to stop working when the pressure switch is switched off, thereby further ensuring that the compressor may be de-energized and stop receiving driving signals to ensure the safe and reliable operation of the compressor. The compressor may also be reliably controlled to stop when pressure of the refrigerating system is abnormal.

BRIEF DESCRIPTION OF THE DRAWINGS

In order to describe the technical solutions in the embodiments of the present application or a conventional art more clearly, the drawings required to be used in descriptions about the embodiments or the conventional art will be briefly introduced below. It is apparent that the drawings described below are only some embodiments of the present application. Those of ordinary skill in the art may further obtain other drawings according to the structures shown in these drawings without creative work.

DESCRIPTIONS ABOUT THE REFERENCE SIGNS

| Reference sign | Name | Reference sign | Name |
| --- | --- | --- | --- |
| 10 | Relay module | SW1 | Pressure switch |
| 20 | Rectifier circuit | U1 | compressor driving chip |
| 30 | Driving control circuit | U2 | Detection control chip |
| 40 | Power supply | 31 | IPM |
| COMP | Compressor | 32 | Signal isolation module |

The achievement of the objective, function features and advantages of the present application will further be described in combination with embodiments and with reference to the drawings.

DETAILED DESCRIPTION OF EMBODIMENTS

The technical solutions in the embodiments of the present application will be clearly and completely described below in combination with the drawings in the embodiments of the present application. It is apparent that the described embodiments are not all but merely part of embodiments of the present application. All other embodiments obtained by those of ordinary skill in the art based on the embodiments in the present application without creative work shall fall within the scope of protection of the present application.

The present application discloses a compressor driving device, which is applied to a refrigerating system. The refrigerating system may be refrigeration equipment with a compressor, e.g., a refrigerator and an air conditioner. Descriptions will be made in each of the following embodiments taking an air conditioner as an example. An indoor unit, an outdoor unit, etc., are usually arranged in the air conditioner. The compressor is usually arranged in the outdoor unit and forms a coolant circulation loop of the refrigerating system with devices such as an outdoor unit heat exchanger, an indoor unit heat exchanger, and an electronic expansion valve.

Compared with an ordinary household air conditioner, a central air conditioner has a higher refrigeration/heating capacity and usually uses a compressor with a larger displacement. Particularly in a variable refrigerant flow system, outdoor units may be connected in parallel and are used by multiple indoor units, pressure in a control system is relatively high, and for pressure equipment and assemblies on which pressure is greater than a certain pressure value, safety control over the pressure equipment is needed to ensure relatively high safety in use. It is absolutely not allowed that the compressor does not timely stop operating and the pressure further keeps rising to damage the air conditioning system in case of abnormal pressure, e.g., overpressure.

Figure 1:
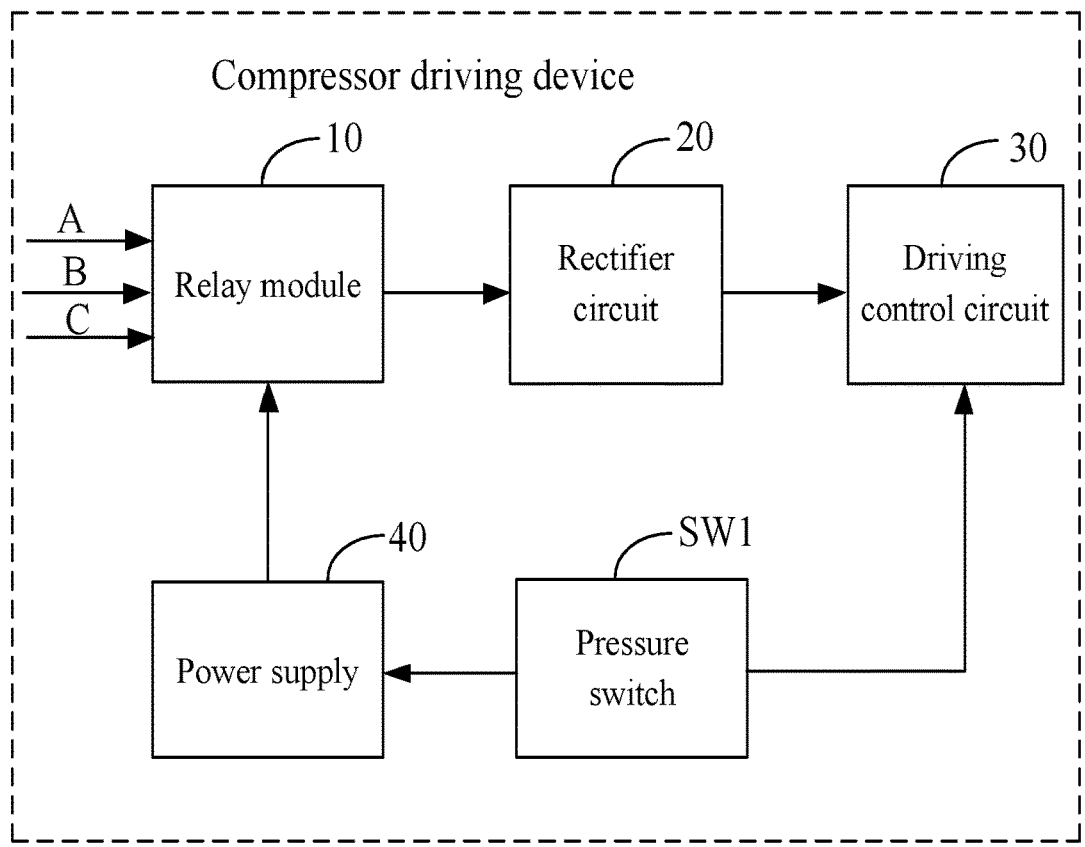
FIG. 1 is a schematic diagram of functional modules of some embodiments of a compressor driving device according to the present application.

In order to solve the foregoing problem, referring to FIG. 1, in some embodiments of the present application, the compressor driving device includes a three-phase alternating current power supply input end (A, B, C), a relay module 10, a rectifier circuit 20, and a driving control circuit 30 which are sequentially connected.

The rectifier circuit 20 is configured to convert connected alternating current into direct current and then output the direct current to a direct current bus.

The driving control circuit 30 is configured to convert the direct current outputted by the direct current bus into COMP driving power to drive the COMP to work.

A pressure switch SW1 is further included. The pressure switch SW1 is connected in series with a power supply circuit of the relay module 10. The pressure switch SW1 is configured to measure a pressure value in the refrigerating system, and when the measured pressure value is greater than a preset pressure threshold, disconnect the power supply circuit of the relay module 10.

The driving control circuit 30 is further configured to detect an on-off state of the pressure switch SW1 and control the COMP to stop working when the pressure switch SW1 is switched off.

In the present embodiments, the pressure switch SW1 may be implemented by two parts, i.e., a pressure detection sensor and a pressure control switch. The pressure detection sensor is configured to detect pressure of the refrigerating system and control the turning-on and turning-off of the pressure control switch according to the pressure. The pressure detection sensor of the pressure switch SW1 may be mounted to an exhaust duct of the COMP to detect the pressure of the refrigerating system. The relay module 10 is located in the power supply circuit of the COMP of the refrigerating system. The pressure control switch is connected in series with the power supply circuit of the relay module 10 and controls the power supply of the relay module 10 to control the turning-on and turning-off of the power supply circuit of the COMP. The pressure control switch may be switched off when the pressure detection sensor detects that the pressure of the refrigerating system exceeds a preset pressure protection threshold (for example, 4.25 MPa) and turned on when the pressure is less than a preset reset threshold (for example, 3.6 MPa). When the pressure detection sensor detects that the pressure of the refrigerating system is excessive, the pressure control switch may be controlled to disconnect the power supply circuit of the COMP of the refrigerator to stop the COMP, thereby achieving a purpose of protecting the COMP. There may be one or more, e.g., three, relay modules 10. Three relays are marked as a first relay RY1, a second relay RY2, and a third relay RY3 respectively. In the first relay RY1, the second relay RY2 and the third relay RY3, the second relay RY2 and the third relay RY3 are connected in series with ends A and B of a three-phase input, and the first relay RY1 is connected in series with a Positive Temperature Coefficient (PTC) relay. The PTC relay is energized to charge a back-end capacitor, drives a Microcontroller Unit (MCU) to control RY1 to be closed after being energized for preset time, and then closes the second relay RY2 and the third relay RY3 after the MCU is driven to detect that a voltage of the bus keeps reaching a certain threshold for certain time. The COMP driving device is further provided with a thermistor connected to the first relay RY1 (the first relay RY1 may be replaced with a contactor). A contact of an operating circuit of the first relay RY1 is in an off state. A current is output to a post stage at first through the PTC thermistor, and substantially powers the post stage through the first relay RY1 when the first relay RY1 is closed. In some embodiments, the driving control circuit 30 further includes an electrolytic capacitor. When the second relay RY2 and the third relay RY3 are turned on, external alternating current power enters the rectifier circuit 20, and charges the high-capacity electrolytic capacitor E1 after being rectified by the rectifier circuit 20, thereby providing stable direct current power for the post-stage driving control circuit 30. The driving control circuit 30 inverts the stable direct current power into alternating current power to control the operation of the COMP.

It can be understood that the pressure switch SW1 is arranged between a relay coil and a power supply 40 in the relay module 10 by series connection. The driving control circuit 30 may further be provided with a voltage detection circuit or a current detection circuit. The voltage detection circuit or the current detection circuit may be implemented by an element such as a resistor. A voltage or current in the power supply circuit of the relay is detected and converted into a corresponding voltage value to determine the on-off state of the pressure switch SW1. The pressure switch SW1 is turned on when the pressure of the refrigerating system is normal, and may be switched off when it is detected that the pressure of the system reaches the protection threshold. The pressure switch SW1 is connected in series with the power supply 40. The driving control circuit 30 may detect a certain voltage value when the pressure switch is turned on, while a detection result is 0 V or a voltage value tending to be 0 V when the pressure switch SW1 is switched off. Whether the pressure switch SW1 is in an off or on state may be judged according to a detected voltage change of the power supply circuit of the relay module.

In general, the relay module 10 is switched off with the turning-off of the power supply 40 after the pressure switch SW1 is switched off such that the power supply 40 of the COMP is switched off. In such case, the COMP is de-energized and thus stopped, and the pressure of the refrigerating system may be recovered soon after the COMP is stopped. Most of pressure switches SW1 are completely mechanical, and the pressure switch SW1 may be turned on once the pressure of the refrigerating system is recovered, thereby recovering the power of the coil of the relay module 10 to a normal state and closing the contact. In such case, the PTC thermistor is still in a high-resistance state, and the first relay RY1 is energized and closed to generate a heavy current. Alternatively, after the pressure switch SW1 is switched off, the COMP may not be timely de-energized and keep working due to a failure such as contact adhesion and coil failure of the relay, which causes the pressure of the refrigerating system to keep rising and further damages devices of the refrigerating system or affects the long-term operating reliability. Therefore, the state of the pressure switch SW1 through the driving control circuit 30 after the shutdown protection of the COMP is detected, and outputting COMP driving signals is stopped when the pressure switch SW1 is in the off state, to further ensure that the COMP stops. Moreover, in some further embodiments, the driving control circuit 30 may further be provided with a delay circuit, to delay for certain time after it is detected that the pressure switch SW1 is turned on to ensure the normal power supply of the COMP, then output a COMP driving signal and resume normal work of the COMP.

According to the present application, the rectifier circuit 20 and the relay module 10 are arranged, and when the relay module 10 is turned on, the rectifier circuit 20 converts connected alternating current of the relay module 10 into direct current and then outputs the direct current to the direct current bus such that the driving control circuit 30 converts the direct current outputted by the direct current bus into COMP driving power according to a received control signal to drive the COMP to work. According to the present application, the pressure switch SW1 is arranged to measure the pressure value in the refrigerating system and, when the measured pressure value is greater than the preset pressure threshold, disconnect the power supply circuit of the relay module 10, so that the power supply circuit of the COMP is disconnected to de-energize the COMP to stop working when each relay is switched off. The driving control circuit 30 controls the COMP to stop working when the pressure switch SW1 is switched off, thereby further ensuring that the COMP may be de-energized and stop receiving driving signals to ensure the safe and reliable operation of the COMP. The COMP may also be reliably controlled to stop when pressure of the refrigerating system is abnormal.

Referring to FIG. 1, in some embodiments, a detection end of the driving control circuit 30 is connected to the direct current bus. The driving control circuit 30 is further configured to detect a voltage of the direct current bus in real time, and when it is detected that the voltage of the direct current bus drops to a first preset voltage value during the work of the COMP, control the COMP to stop working.

It can be understood that the COMP may be driven normally when the voltage of the direct current bus is in a preset normal range and may be damaged if the voltage is excessively high or low. When the alternating current power is suddenly disconnected or the relay module 10 is switched off, the voltage of the direct current bus may drop to finally stop the COMP. When the power is suddenly disconnected and then recovered, namely in case of a power jitter, the PTC thermistor may still be in a high-resistance state, and the first relay RY1 is energized and closed to generate a heavy current, thereby damaging post-stage circuits and loads such as the relay and the COMP.

Therefore, in the present embodiments, the driving control circuit 30 further includes a voltage detection circuit configured to detect the voltage of the direct current bus. The voltage detection circuit may be implemented by a resistance voltage division detection circuit consisting of a resistor. When the COMP works, namely the pressure switch SW1 is not off and the relay is still in an on state, the resistance voltage division detection circuit detects the voltage on the direct current bus in real time, and when detecting that the voltage of the direct current bus sharply drops to the first preset voltage value (the first preset voltage value may be a voltage value under an undervoltage condition, or a voltage value incapable of keeping the normal work of the COMP, e.g., 0 V), stops outputting COMP driving signals to control the COMP to stop.

It can be understood that disconnecting the power of the relay may turn off the relay to further disconnect the power the COMP when each relay in the relay module is normal, and the relay of the relay module may still have a power output when a failure, e.g., contact adhesion and coil failure, occurs to the relay module and the pressure switch is switched off.

In order to solve the foregoing problem, referring to FIG. 1, in some embodiments, the driving control circuit 30 is further configured to control the COMP to keep a non-working state when it is detected that the pressure switch SW1 is switched off and the detected voltage of the direct current bus is greater than or equal to a second preset voltage value.

In the present embodiments, after the pressure switch SW1 is switched off, there may still be a power input after the power of the relay is disconnected due to a failure such as contact adhesion and coil failure of the relay, so that the voltage of the direct current bus is output to the driving control circuit 30, stable direct current power is provided for the post-stage driving control circuit 30, and the driving control circuit 30 inverts the stable direct current power to control the operation of the COMP. As a result, the COMP is not timely de-energized and keeps working, which causes the pressure of the refrigerating system to keep rising and further damages the devices of the refrigerating system or affects the long-term operating reliability. Solving the foregoing problem, can include detecting the state of the pressure switch SW1 through the driving control circuit 30 after the shutdown protection of the COMP. It may be determined that the relay malfunctions when it is detected that the voltage of the direct current bus is greater than or equal to the second preset voltage value under the condition that the pressure switch SW1 is in an off state. In such case, the driving control circuit 30 continues to output a COMP shutdown control signal even though the pressure switch SW1 detects that the pressure of the refrigerating system is recovered to a normal value and is turned on, to ensure that the COMP keeps the non-working state until the failure of the relay is removed.

Of course, in some embodiments, no more COMP driving signals may be output after the voltage of the direct current bus is detected and it is determined that the relay malfunctions, to control the COMP to stop working.

Referring to FIG. 1, in some further embodiments, the driving control circuit 30 is further configured to start timing when it is detected that the pressure switch SW1 is switched off, detect whether a voltage value on the direct current bus is greater than the second preset voltage value after a preset time has been reached, and when the voltage value on the direct current bus is greater than or equal to the second preset voltage value, determine that the relay module 10 malfunctions and control the COMP to stop working. The second preset voltage value may be a voltage value when the voltage of the direct current bus is output normally or a voltage value slightly less than that when the voltage of the direct current bus is output normally.

It can be understood that, after the pressure switch SW1 is switched off to turn off the power supply 40 of the relay, the voltage on the direct current bus may be kept unchanged because there may be certain hysteresis separation time for the relay and the relay is still in an on state in the hysteresis separation time of the relay. Therefore, for avoiding misjudgments, in the present embodiments, timing is started when it is detected that the pressure switch SW1 is switched off, whether the voltage on the direct current bus drops is detected after the preset time has been reached (the preset time is longer than the hysteresis separation time of the relay), and if it is detected that the voltage does not drop and is still greater than or equal to the second preset voltage value, it may be determined that the relay is not off due to a failure such as contact adhesion and coil failure and driving signals for stopping the COMP are further continuously output, to further ensure that the COMP is stopped.

In some embodiments, the COMP driving device may further include a failure alarming circuit, e.g., an audible and visual alarming circuit, or may output a malfunction detection signal to MCUs of an indoor unit, an outdoor unit, etc., such that the MCUs output corresponding alarming signals to notify a user to overhaul the relay.

Figure 2:
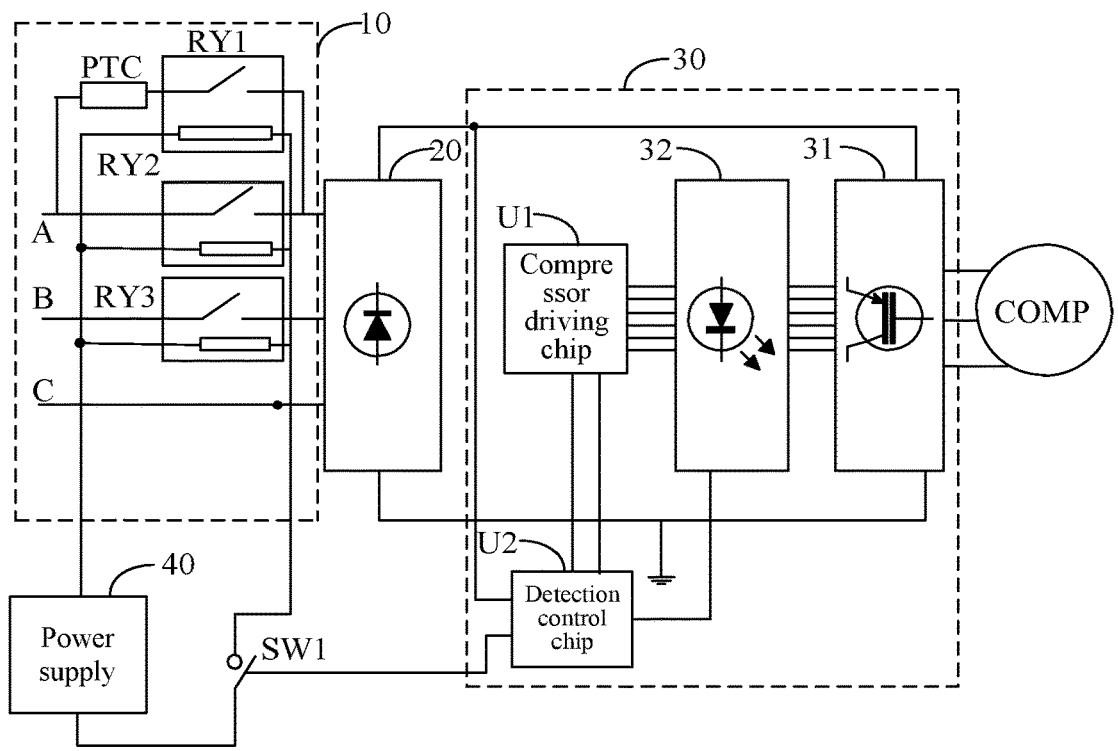
FIG. 2 is a schematic diagram of a circuit structure of some embodiments of a compressor driving device according to the present application.

Referring to FIGS. 1 and 2, in some embodiments, the driving control circuit 30 includes a COMP driving chip U1. The COMP driving chip U1 is configured to control the COMP to work and detect an operating state of the COMP.

A COMP driving chip U1, a bridge rectifier circuit, a filter capacitor and an inverter bridge circuit are usually arranged in the COMP driving device. In some embodiments, a Printed Flexible Circuit (PFC) may further be arranged, which is configured to make a waveform of an input current of the direct current bus follow that of an input voltage, perform power factor correction on the connected voltage of the direct current bus and output the corrected voltage to the inverter bridge circuit. The inverter bridge circuit may be implemented by an IPM 31. A High Voltage Integrated Circuit (HVIC), a Low Voltage Integrated Circuit (LVIC), and a three-phase leg circuit consisting of power switch tubes such as an Insulated Gate Bipolar Transistor (IGBT) and a Metal Oxide Semiconductor (MOS) transistor are integrated into the IPM 31. Detection circuits configured to detect the state of the COMP such as a voltage detection circuit, a current detection circuit and a temperature sensor may further be integrated into the IPM 31. A signal isolation module 32 is further arranged between the COMP driving chip U1 and the IPM. The COMP driving chip U1 sends a control signal to the IPM through the signal isolation module 32. The control signal may be, for example, a Pulse Width Modulation (PWM) signal, and is configured to control the turning-on and turning-off of a corresponding power switch tube in the IPM to further control the operation of the COMP of the refrigerating system. In addition, the COMP driving chip U1, the IPM 31 and the signal isolation module 32 may be powered by a switching power supply.

Hardware circuits such as an Analog-to-Digital (AD) conversion circuit, a timer, a comparator and an operational amplifier and a software algorithm program configured to drive the COMP are integrated into the COMP driving chip U1. The COMP driving chip U1 may output a frequency adjustable COMP driving signal based on the control of a master control chip of the indoor unit or the control of a master control chip of the outdoor unit and the received control signal to control the COMP. Specifically, the COMP is driven based on a software algorithm to reach a target rotating speed after the target rotating speed sent by the master control chip is received. In some embodiments, the COMP driving chip U1 may also obtain rotating speed information of the COMP according to a detection signal such as a detected current and voltage of the COMP to further obtain state information of the COMP.

Referring to FIGS. 1 and 2, in some embodiments, the driving control circuit 30 further includes a detection driving chip U2. The detection control chip U2 is connected to the COMP driving chip U1.

The detection control chip U2 is configured to detect the on-off state of the pressure switch SW1 when it is determined that the COMP is in a working state according to the operating state, detected by the COMP driving chip U1, of the COMP.

In the present embodiments, the detection control chip U2 is in communication connection with the COMP driving chip U1, and when it is determined that the COMP is in a working state, detects the on-off state of the pressure switch SW1 and detects in real time the voltage of the direct current bus. When it is determined that the COMP stops working, the detection control chip U2 stops working and keeps a sleep state, to reduce the power consumption of the driving control circuit 30 to save energy and protect the environment. The detection control chip U2 is arranged to detect the on-off state of the pressure switch SW1 and carry out corresponding control according to the on-off state of the pressure switch SW1, thereby reducing software algorithms of the COMP driving chip U1, improving the processing speed of the COMP driving chip U1 for COMP data and further improving the driving efficiency of the COMP.

Hardware such as a Central Processing Unit (CPU), a test register, flag bits, an arithmetic unit, a program stream monitor, a watchdog, Input/Output (TO), a Random Access Memory (RAM), a Read-Only Memory (ROM) and AD, and software algorithms for safety function checking are integrated into the detection control chip U2 to implement self-diagnosis to prevent failure accumulation and improve a Diagnostic Coverage (DC) of the detection control chip U2. The hardware and software of each part of the detection control chip U2 are timely periodically detected to ensure the normal work of the detection control chip U2, thereby timely and effectively implementing the shutdown protection over the COMP to improve the safety of the refrigerating system in case of a relatively high failure probability caused by temporary system overpressure of the COMP driving device, accidents such as overvoltage and short-circuit of a COMP driving circuit, or occasional component defects.

In some embodiments, the COMP driving device further includes an electronic control board (not shown in the figures). A slot is disposed at the electronic control board. The detection control chip is detachably mounted in the slot.

In the present embodiments, the detection control chip U2 is detachably arranged in the slot, namely whether to arrange the detection control chip U2 may be selected as required by a practical application. In the present embodiments, with the arrangement of the detection control chip U2, the shutdown protection over the COMP may be implemented to improve the safety of the refrigerating system in case of a relatively high failure probability caused by temporary system overpressure of the COMP driving device, accidents such as overvoltage and short-circuit of a COMP driving circuit, or occasional component defects. In some embodiments, the detection control chip U2 may not be arranged, to reduce the production cost. In the present embodiments, the detection control chip U2 is arranged in a plug-in card (slot) form. The detection control chip U2 is selectively arranged as practically required, so that the universality of the electronic control board of the COMP driving device may be improved.

Referring to FIGS. 1 and 2, in some embodiments, the driving control circuit 30 further includes an IPM 31 and a signal isolation module 32. An input end of the signal isolation module 32 is connected to an output end of the COMP driving chip U1. An output end of the signal isolation module 32 is connected to an input end of the IPM 31.

The IPM 31 is configured to drive the COMP to operate at a corresponding rotation speed according to a control signal outputted by the COMP driving chip U1.

The detection control chip U2 is further configured to control the signal isolation module 32 to stop working to stop outputting COMP driving signals when it is detected that the pressure switch SW1 is switched off.

In the present embodiments, the detection control chip U2 may control the signal isolation module 32 to work according to the turning-on and turning-off of the pressure switch SW1. When it is detected that the pressure switch SW1 is turned on, the signal isolation module 32 is controlled to work to output a COMP driving signal outputted by the COMP driving chip U1 to the IPM 31, and the IPM 31 converts the connected voltage of the direct current bus into alternating current power according to the COMP driving signal and then outputs the alternating current power to the COMP to further drive the COMP to work. When it is detected that the pressure switch SW1 is switched off, the signal isolation module 32 is controlled to stop working so as to disconnect the COMP driving signal outputted by the COMP driving chip U1, and the IPM 31 stops working when not receiving the COMP driving signal so as to control the COMP to stop. The signal isolation module 32 may be implemented by an optocoupler, and implements the IO isolation of the COMP driving signal when being turned on.

In some embodiments, an IO port configured to transmit the state of the pressure switch may further be added between the detection control chip U2 and the COMP driving chip U1. The detection control chip U2 may send a 0/1 signal to the COMP driving signal U1 after detecting that the pressure switch is switched off/on. The COMP driving chip U1 may control six paths of PWM outputs to be disconnected after receiving this signal. Therefore, a purpose of dual protection is achieved.

Referring to FIGS. 1 and 2, in some embodiments, the COMP driving chip U1 and the detection control chip U2 are integrated into the same chip.

It can be understood that the COMP driving chip U1 and the detection control chip U2 may be implemented by two independent MCUs, or the COMP driving chip U1 and the detection control chip U2 may be integrated into the same chip, namely the integrated chip may realize both COMP driving and COMP shutdown protection functions, so that the integration level of the driving control circuit 30 may be improved, and the cost of the COMP driving device may be reduced. When the COMP driving chip U1 and the detection control chip U2 are integrated into the same chip, the integrated chip may not only implement driving control over the COMP according to the control signal outputted by the master control chip in the refrigerating system but also implement shutdown protection over the COMP according to the on-off state of the pressure switch SW1.

The present application also discloses a COMP pressure protection method, which is applied to a refrigerating system.

Figure 3:
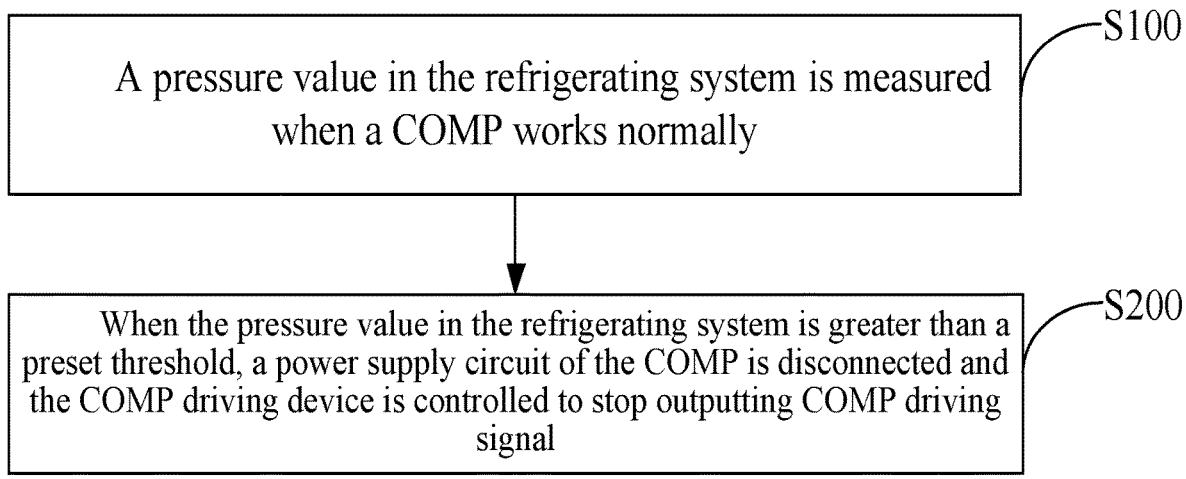
FIG. 3 is a flowchart of some embodiments of a compressor pressure protection method according to the present application.

Referring to FIG. 3, the refrigerating system includes a COMP driving device. The COMP pressure protection method includes the following steps.

In S100, a pressure value in the refrigerating system is measured when a COMP works normally.

In the present embodiments, a pressure switch may be arranged in a pipeline loop on a high-voltage side of the refrigerating system to detect system pressure. When the system pressure reaches a protection threshold of the pressure switch, the pressure switch may act to power off the COMP to stop the COMP. When the system pressure decreases to a recovery threshold of the pressure switch, the pressure switch may be turned on again to power on the COMP.

In S200, when the pressure value in the refrigerating system is greater than a preset threshold, a power supply circuit of the COMP is disconnected, and the COMP driving device is controlled to stop outputting COMP driving signals.

In the present embodiments, when the pressure value in the refrigerating system is greater than the preset threshold, the pressure switch may be controlled to be switched off, thereby disconnecting the power supply circuit of the COMP to avoid the COMP operating in a high-voltage state to protect the COMP. In the present embodiments, when it is detected that the pressure switch is switched off, no more COMP driving signals may be output, thereby further ensuring that the COMP stops.

According to the present application, the pressure value in the refrigerating system is measured when the COMP works normally; and when the measured pressure value is greater than the preset pressure threshold, the power supply circuit of the COMP is disconnected, and the COMP driving device is controlled to stop outputting COMP driving signals to control the COMP to work working, thereby further ensuring that the COMP may be de-energized and stop receiving driving signals to ensure the safe and reliable operation of the COMP. The COMP may also be reliably controlled to stop when pressure of the refrigerating system is abnormal.

Figure 4:
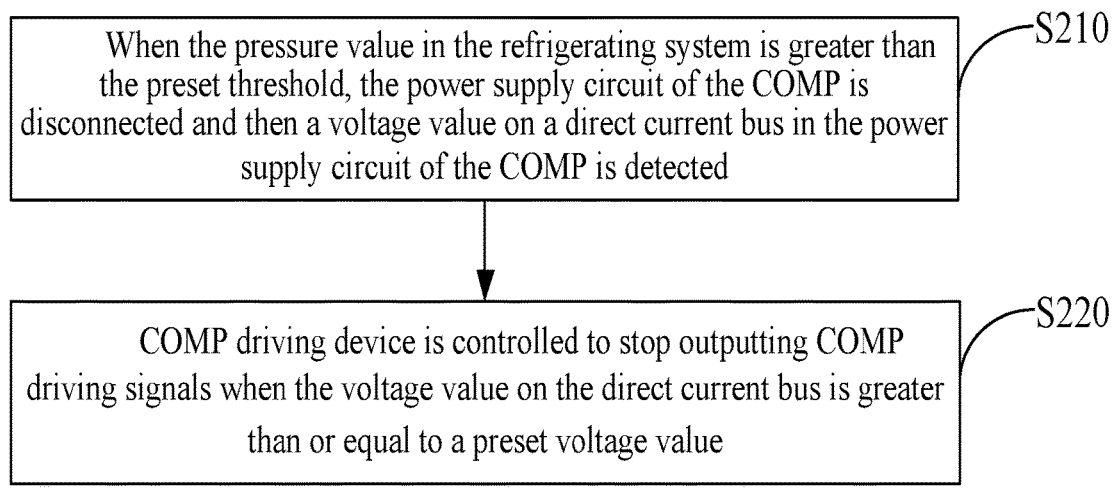
FIG. 4 is a detailed flowchart of S200 in the compressor pressure protection method shown in FIG. 3.

Referring to FIG. 4, in some embodiments, the operation that a power supply circuit of the COMP is disconnected and the COMP driving device is controlled to stop outputting COMP driving signals when the pressure value in the refrigerating system is greater than a preset threshold includes the following steps.

In S210, when the pressure value in the refrigerating system is greater than the preset threshold, the power supply circuit of the COMP is disconnected, and then a voltage value on a direct current bus in the power supply circuit of the COMP is detected.

In S220, the COMP driving device is controlled to stop outputting COMP driving signals when the voltage value on the direct current bus is greater than or equal to a preset voltage value.

In the present embodiments, after the pressure switch is switched off, there may still be a power input after the power of the relay is disconnected due to a failure such as contact adhesion and coil failure of the relay, so that the voltage of the direct current bus is output to the driving control circuit, stable direct current power is provided for the post-stage driving control circuit, and the driving control circuit inverts the stable direct current power to control the operation of the COMP. As a result, the COMP is not timely de-energized and keeps working, which causes the pressure of the refrigerating system to keep rising and further damages the devices of the refrigerating system or affects the long-term operating reliability. Solving the foregoing problem, can include detecting the state of the pressure switch through a driving control circuit after the shutdown protection of the COMP. When it is detected that the voltage of the direct current bus is greater than or equal to the preset voltage value under the condition that the pressure switch is in an off state, it may be determined that a relay malfunctions when, and furthermore, no more COMP driving signals are stopped, thereby further ensuring that the COMP stops.

The present application also discloses an air conditioner, which includes the abovementioned COMP driving device. A detailed structure of the COMP driving device may refer to the abovementioned embodiments, and will not be elaborated herein. It can be understood that, since the abovementioned COMP driving device is used in the air conditioner of the present application, embodiments of the air conditioner of the present application include some or all of the technical solutions of all the embodiments of the COMP driving device, and achieved technical effects are completely or substantially the same. Elaborations are omitted herein.

The above is only some optional embodiments of the present application and not thus intended to limit the patent scope of the present application. Any equivalent structure transformations or made by use of the contents of the specification and drawings of the present application under the inventive concept of the present application or direct/indirect application to other related technical fields fall within the patent protection scope of the present application.

What is claimed is:

1. A compressor driving device, used for driving a compressor of a refrigerating system, comprising:
   a three-phase alternating current power supply input end;
   a relay module;
   a rectifier circuit; and
   a driving control circuit which are sequentially connected, wherein:

the rectifier circuit is configured to convert a connected alternating current into a direct current and then output the direct current to a direct current bus;

the driving control circuit is configured to convert the direct current outputted by the direct current bus into compressor driving power to drive the compressor;

the compressor driving device further comprises a pressure switch, the pressure switch is connected in series to a power supply circuit of the relay module, and configured to measure a pressure value in the refrigerating system and disconnect the power supply circuit of the relay module when the measured pressure value is greater than a preset pressure threshold; and the driving control circuit is further configured to detect an on-off state of the pressure switch and control the compressor to stop working when the pressure switch is switched off.

2. A compressor driving device, used for driving a compressor of a refrigerating system, comprising:

a three-phase alternating current power supply input end;
a relay module;
a rectifier circuit; and
a driving control circuit which are sequentially connected, wherein:

the rectifier circuit is configured to convert a connected alternating current into a direct current and then output the direct current to a direct current bus;

the driving control circuit is configured to convert the direct current outputted by the direct current bus into compressor driving power to drive the compressor;

the compressor driving device further comprises a pressure switch, the pressure switch is connected in series to a power supply circuit of the relay module, and configured to measure a pressure value in the refrigerating system and disconnect the power supply circuit of the relay module when the measured pressure value is greater than a preset pressure threshold; and the driving control circuit is further configured to detect an on-off state of the pressure switch and control the compressor to stop working when the pressure switch is switched off, wherein a detection end of the driving control circuit is connected to the direct current bus, the driving control circuit is further configured to detect a voltage of the direct current bus in real time, and control the compressor to stop working when it is detected that the voltage of the direct current bus drops to a first preset voltage value during the work of the compressor.

3. The compressor driving device of claim 2, wherein the driving control circuit is further configured to control the compressor to keep a non-working state when it is detected that the pressure switch is switched off and the detected voltage of the direct current bus is greater than or equal to a second preset voltage value.

4. The compressor driving device of claim 3, wherein the driving control circuit is further configured to:

start timing when it is detected that the pressure switch is switched off, detect whether a voltage value on the direct current bus is greater than the second preset voltage value after a preset time has been reached, and determine that the relay module malfunctions and output a malfunction detection signal when the voltage value on the direct current bus is greater than or equal to the second preset voltage value.

5. The compressor driving device of claim 1, wherein the driving control circuit comprises a compressor driving chip, the compressor driving chip is configured to control the compressor to work and detect an operating state of the compressor.

6. The compressor driving device of claim 5, wherein the driving control circuit further comprises a detection control chip connected to the compressor driving chip;

the detection control chip is configured to, according to a compressor state signal outputted by the compressor driving chip, detect the on-off state of the pressure switch when it is determined that the compressor is in a working state.

7. The compressor driving device of claim 6, further comprising an electronic control board, wherein a slot is disposed at the electronic control board and the detection control chip is detachably mounted in the slot.

8. The compressor driving device of claim 6, wherein the driving control circuit further comprises an intelligent power module and a signal isolation module, an input end of the signal isolation module is connected to an output end of the compressor driving chip, and an output end of the signal isolation module is connected to an input end of the intelligent power module, wherein the intelligent power module is configured to drive the compressor to operate at a corresponding rotation speed according to a control signal outputted by the compressor driving chip;

the detection control chip is further configured to control the signal isolation module to stop working to stop outputting a compressor driving signal when it is detected that the pressure switch is switched off;

and/or, the detection control chip is further configured to control the compressor driving chip to stop outputting a compressor driving signal when it is detected that the pressure switch is switched off.

9. An air conditioner comprising a compressor driving device of claim 1.

10. A compressor pressure protection method for a refrigerating system comprising a compressor driving device, the method comprising:

measuring a pressure value in the refrigerating system when a compressor works normally; and disconnecting a power supply circuit of the compressor and controlling the driving device to stop outputting a compressor driving signal when the pressure value in the refrigerating system is greater than a preset threshold, including when the pressure value in the refrigerating system is greater than the preset threshold, disconnecting the power supply circuit of the compressor, and then detecting a voltage value on a direct current bus in the power supply circuit of the compressor; and controlling the compressor driving device to stop outputting a compressor driving signal when the voltage value on the direct current bus is greater than or equal to a preset voltage value.

* * * * *